United States Patent

Sato

(10) Patent No.: US 10,482,138 B2
(45) Date of Patent: Nov. 19, 2019

(54) FEATURE TERM CLASSIFICATION METHOD, INFORMATION PROCESSING APPARATUS, AND STORAGE MEDIUM

(71) Applicant: FUJITSU LIMITED, Kawasaki-shi, Kanagawa (JP)

(72) Inventor: Yoichi Sato, Aomori (JP)

(73) Assignee: FUJITSU LIMITED, Kawasaki (JP)

( * ) Notice: Subject to any disclaimer, the term of this patent is extended or adjusted under 35 U.S.C. 154(b) by 164 days.

(21) Appl. No.: 15/890,547

(22) Filed: Feb. 7, 2018

(65) Prior Publication Data

US 2018/0253495 A1 Sep. 6, 2018

(30) Foreign Application Priority Data

Mar. 3, 2017 (JP) ................. 2017-040547

(51) Int. Cl.
*G06F 16/951* (2019.01)
*G06K 9/32* (2006.01)
(Continued)

(52) U.S. Cl.
CPC ........ *G06F 16/951* (2019.01); *G06F 16/5846* (2019.01); *G06K 9/00456* (2013.01);
(Continued)

(58) Field of Classification Search
CPC .... G06F 16/951; G06F 16/29; G06F 16/9537; G06F 16/5846; G06F 3/0482; G06K 9/00469; G06K 9/325; G06K 9/00456
(Continued)

(56) References Cited

U.S. PATENT DOCUMENTS

2005/0262062 A1 11/2005 Xia
2010/0077003 A1 3/2010 Kondo et al.
(Continued)

FOREIGN PATENT DOCUMENTS

JP 2009-159437 7/2009
WO 2008/152805 A1 12/2008

OTHER PUBLICATIONS

European Office Action dated Apr. 24, 2019 for corresponding European Patent Application No. 18156662.1, 7 pages. Please note US-2014/006408-A1 cited herewith, was previously cited in an IDS filed on May 30, 2018.*.

(Continued)

*Primary Examiner* — Amandeep Saini
(74) *Attorney, Agent, or Firm* — Fujitsu Patent Center

(57) ABSTRACT

A feature term classification method executed by a processor included in an information processing apparatus including a display device and a memory, the feature term classification method includes extracting a feature term from a Web page displayed on a screen of the display device; executing image searching using the extracted feature term; classifying the feature term based on whether an image has been detected as information corresponding to the feature term in the image searching; storing the information corresponding to the feature term in the memory; when a new feature term has been input, extracting a Web page corresponding to the new feature term from the stored information corresponding to the feature terms; and displaying the extracted Web page.

15 Claims, 10 Drawing Sheets

(51) Int. Cl.
    *G06K 9/00*         (2006.01)
    *G06F 16/583*     (2019.01)
    *G06F 3/0482*     (2013.01)

(52) U.S. Cl.
    CPC ......... *G06K 9/00469* (2013.01); *G06K 9/325* (2013.01); *G06F 3/0482* (2013.01)

(58) Field of Classification Search
    USPC .......................................................... 382/100
    See application file for complete search history.

(56) References Cited

U.S. PATENT DOCUMENTS

2014/0006408 A1*  1/2014  Rae ....................... G06F 16/951
                                                                                707/740
2016/0179969 A1*  6/2016  Greathouse ......... G06F 16/9535
                                                                                   707/710

OTHER PUBLICATIONS

Extended European Search Report dated May 28, 2018 for corresponding European Patent Application No. 18156662.1, 8 pages.
Hoffart, Johannes et al.,"YAGO2: A spatially and temporally enhanced knowledge base from Wikipedia", Artificial Intelligence, vol. 194, Jan. 1, 2013, pp. 28-61, XP55413613.

* cited by examiner

| SPOT ID | SPOT NAME | URL | EXPLANATION | ... |
|---|---|---|---|---|
| 151 | SPOT A | http://○△□ | Osamu Dazai ... ramen ... | ... |
| 152 | SPOT B | http://○○○ | Osamu Dazai ... novel ... | ... |
| 153 | SPOT C | http://△△△ | ... of Osamu Dazai ... | ... |
| 154 | SPOT D | http://□□□ | ... to Osamu Dazai ... | ... |
| ... | ... | ... | ... | ... |

FIG. 3

| SPOT ID | FEATURE TERM |
|---|---|
| 151 | Osamu Dazai |
| 151 | RAMEN |
| 152 | Osamu Dazai |
| 152 | NOVEL |
| 153 | Osamu Dazai |
| 154 | Osamu Dazai |
| ... | ... |

122

FEATURE TERM CLASSIFICATION METHOD, INFORMATION PROCESSING APPARATUS, AND STORAGE MEDIUM

CROSS-REFERENCE TO RELATED APPLICATION

This application is based upon and claims the benefit of priority of the prior Japanese Patent Application No. 2017-40547, filed on Mar. 3, 2017, the entire contents of which are incorporated herein by reference.

FIELD

The embodiments discussed herein are relate to a feature term classification method, an information processing apparatus, and a storage medium.

BACKGROUND

For example, there is a case where a person performs a search to acquire information about a sightseeing spot that the person wants to visit at the time of creating a travel plan. In a case where there are a plurality of sightseeing spots that the person wants to visit, for example, the person searches a search site to acquire information about one of the sightseeing spots and then searches the search site again for information about another one of the sightseeing spots. In the search, a sightseeing spot name and another word are sometimes used in combination as search words.

As a method of acquiring a search word, for example, a method has been proposed of acquiring video data of a TV broadcast, extracting character information from regions in a predetermined number of frames between which there is no difference, and employing the extracted character information as a search keyword. For example, a method has been proposed of retrieving an image similar to an input recognition target image, extracting a plurality of keywords from information attached to the similar image, analyzing the extracted keywords, and specifying one of the keywords as a keyword that is likely to be a recognition result of the recognition target image. For example, Japanese Laid-open Patent Publication No. 2009-159437 and international Publication Pamphlet No. WO 2008/152805 are disclosed as related arts.

However, for example, the scope of a search becomes too large depending on a search word, and it may be difficult for a user to acquire desired information from a search result. In order to solve this problem, a method can be considered of storing the feature term of each Web site in a database to be used for a search and associating a sightseeing spot name and the feature term with each other. As a result, in a search on a sightseeing spot name, a web site having a feature term associated with the sightseeing spot name is hit. However, since feature terms include many conceptual words such as "explanation" and "experience", an undesired search result may be listed high It is therefore desired that feature terms be classified.

SUMMARY

According to an aspect of the invention, a feature term classification method executed by a processor included in an information processing apparatus including a display device and a memory, the feature term classification method includes extracting a feature term from a Web page displayed on a screen of the display device; executing image searching using the extracted feature term; classifying the feature term based on whether an image has been detected as information corresponding to the feature term in the image searching; storing the information corresponding to the feature term in the memory; when a new feature term has been input, extracting a Web page corresponding to the new feature term from the stored information corresponding to the feature terms; and displaying the extracted Web page.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram illustrating an example of a sightseeing information storage portion;

FIG. 3 is a diagram illustrating an example of a feature term storage portion;

DESCRIPTION OF EMBODIMENTS

Embodiments of a feature term classification program, a feature term classification method, and an information processing apparatus, which are disclosed by the present application, will be described in detail below with reference to the accompanying drawings. The disclosed techniques are not limited by these embodiments. The following embodiments may be combined as appropriate without causing inconsistency.

Embodiments

Figure 1:
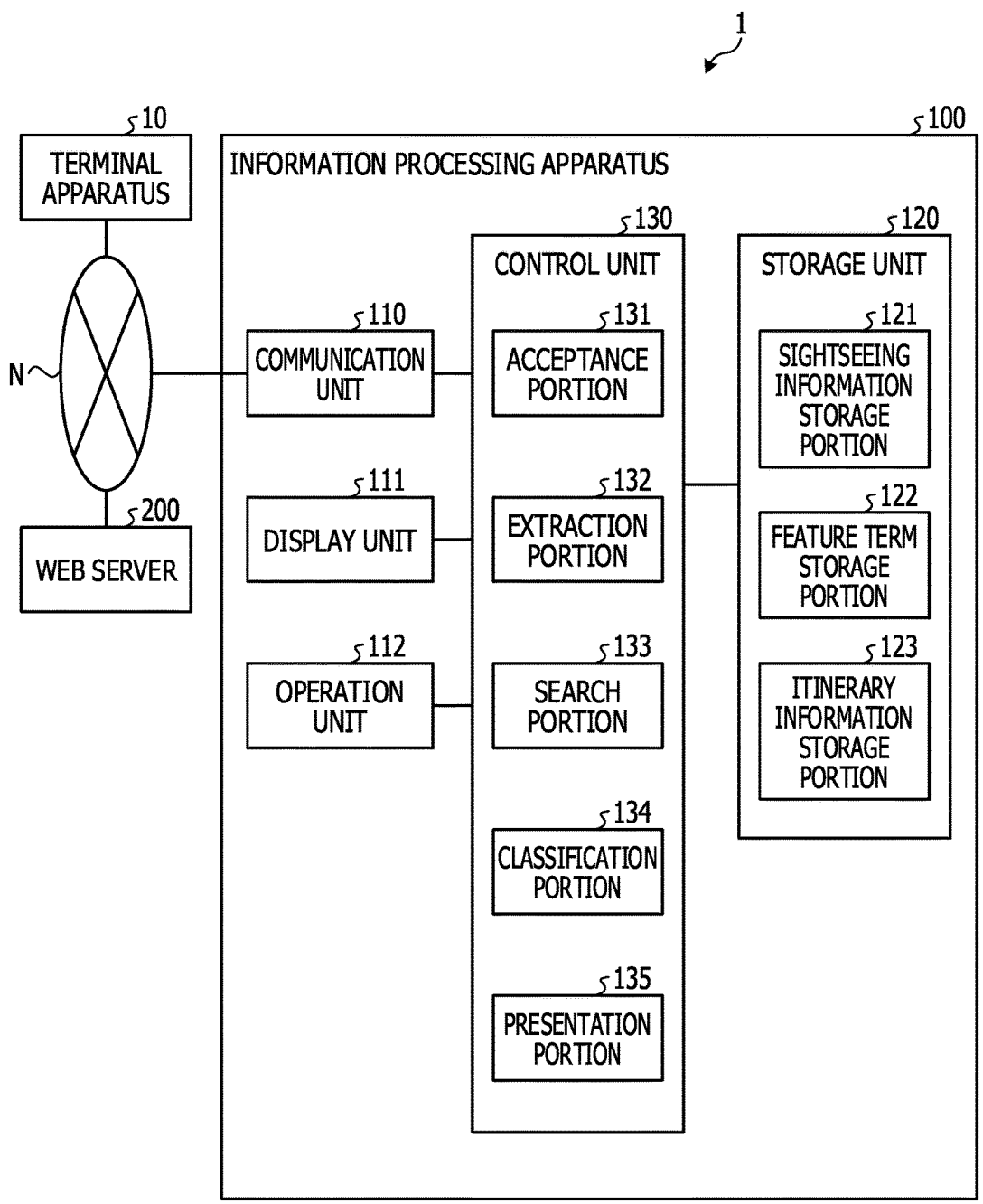
FIG. 1 is a block diagram illustrating an exemplary configuration of an information processing system according to an embodiment.

FIG. 1 is a block diagram illustrating an exemplary configuration of an information processing system according to an embodiment. An information processing system 1 illustrated in FIG. 1 includes a terminal apparatus 10, an information processing apparatus 100, and a Web server 200. Any number of the terminal apparatuses 10 and the Web servers 200 may be provided. The terminal apparatus 10, the information processing apparatus 100, and the Web server 200 are communicably connected to one another via a network N. As the network N, any type of communication network such as the Internet, a local area network (LAN), or a virtual private network (VPN) may be used regardless whether the network is a wired or a wireless network.

The terminal apparatus 10 is, for example, an information processing apparatus via which a user browses a Web page provided by the Web server 200. As the terminal apparatus 10, for example, a portable or stationary personal computer can be used. Alternatively, as the terminal apparatus 10, a mobile communication terminal such as a tablet terminal or a smartphone may be used. In the terminal apparatus 10, for example, a user goes to the, sites of various sightseeing spots via a search site. On a Web page for the site of a sightseeing spot, for example, a button for providing information presentation service in which sightseeing information relevant to the sightseeing spot is presented is placed. When a user pressed the button, the terminal apparatus 10 transmits a presentation instruction to the information processing apparatus 100. The terminal apparatus 10 receives screen information for presentation corresponding to the presentation instruction, for example, information for pop-up display from the information processing apparatus 100.

The terminal apparatus 10, for example, pops up a presentation screen on a currently displayed Web page based on the received screen information for presentation. On the displayed presentation screen, information about a sightseeing spot relevant to the currently displayed Web page is displayed and an add button used to add the displayed sightseeing spot to a travel plan is also displayed. When a user presses the add button, the terminal apparatus 10 transmits an addition instruction for adding a sightseeing spot corresponding to the pressed add button to the information processing apparatus 100. The terminal apparatus 10 receives and displays a travel plan creation page to accept the selection of a travel plan. The terminal apparatus 10 transmits accepted travel plan selection information to the information processing apparatus 100. After an operation of closing the presentation screen has been performed, the terminal apparatus 10 transmits a presentation end instruction to the information processing apparatus 100.

The information processing apparatus 100 is an information processing apparatus for analyzing a Web page for the site of a sightseeing spot, extracting and classifying a feature term, associating, the feature term with the Web page, and storing them. The information processing apparatus 100 is an information processing apparatus for providing the sightseeing information and the travel plan creation page in response to a request from the terminal apparatus 10. The information processing apparatus 100 extracts a feature term from a Web page, makes a search using the extracted feature term, and classifies the feature term based on a fact about whether an image has been detected as information corresponding to the feature term in the searching. Thus, the information processing apparatus 100 can classify the feature term.

The information processing apparatus 100 provides the information presentation service on a Web page for a sightseeing spot provided by the Web server 200. Upon receiving the presentation instruction from the terminal apparatus 10, the information processing apparatus 100 transmits the screen information for presentation to the terminal apparatus 10. Upon receiving the addition instruction from the terminal apparatus 10, the information processing apparatus 100 transmits the travel plan creation page based on the addition instruction to the terminal apparatus 10. Upon receiving the travel plan selection information from the terminal apparatus 10, the information processing apparatus 100 updates itinerary information regarding a user's travel plan.

The Web server 200 is an information processing apparatus for providing, for example, the site of a sightseeing spot. A Web page for the site of a sightseeing spot provided by the Web server 200 is analyzed by, for example, the information processing apparatus 100. After that, on the Web page for the site of the sightseeing spot, for example, a button used to start the information presentation service provided by the information processing apparatus 100 is placed.

Next, the configuration of the information processing apparatus 100 will be described. As illustrated in FIG. 1, the information processing apparatus 100 includes a communication unit 110, a display unit 111, an operation unit 112, a storage unit 120, and a control unit 130. The information processing apparatus 100 may also include various functional units in a known computer, for example, various types of input devices and audio output devices, in addition to the functional units illustrated in FIG. 1.

The communication unit 110 is realized by, for example, a network interface card (NIC). The communication unit 110 is a communication interface that is coupled, in a wired or wireless manner, to the terminal apparatus 10 and the Web server 200 via the network N. The communication unit 110 manages communication of information with the terminal device 10 and the Web server 200. The communication unit 110 transmits the screen information for presentation, the travel plan creation page, and the like input from the control unit 130 to the terminal apparatus 10. The communication unit 110 outputs the presentation instruction, the addition instruction, and the travel plan selection information which have been received from the terminal apparatus 10 to the control unit 130.

The display unit 111 is a display device for displaying various pieces of information for the administrator of the information processing, apparatus 100. The display unit 111 is realized by, for example, a liquid crystal display. The display unit 111 displays various screens including a display screen input from the control unit 130.

The operation unit 112 is an input device for accepting various operations by the administrator of the information processing apparatus 100. The operation unit 112 is realized by, for example, a keyboard and a mouse. The operation unit 112 outputs an operation performed by the administrator to the control unit 130 as operational information. The operation unit 112 may be realized by a touch panel or the like. The display unit 111 that is, a display device and the operation unit 112 that is an input device may be integrated.

The storage unit 120 is realized by, for example, a storage device that is a semiconductor memory device such as a Random Access Memory (RAM) or a flash memory, a hard disk, or an optical disc. The storage unit 120 includes a sightseeing information storage portion 121, a feature term storage portion 122, and an itinerary information storage portion 123. The storage unit 120 stores information to be used for processing in the control unit 130.

The sightseeing information storage portion 121 associates a sightseeing spot and the explanation of a sightseeing spot acquired from an analysis target Web page with each other and sores them. FIG. 2 is a diagram illustrating an example of the sightseeing information storage portion. As illustrated in FIG. 2, the sightseeing information storage portion 121 has items of "spot ID (Identifier)", "spot name", "Uniform Resource Locator (URL)" and "explanation". The sightseeing information storage portion 121 stores, for example, each spot ID as a single record.

The "spot ID" is an identifier identifying a Web page for introducing a sightseeing spot. For example, in a case where there are a plurality of Web pages for introducing the same sightseeing spot, the Web pages are assigned with different spot IDs. The "spot name" is information representing the name of a sightseeing spot. The "URL" is information representing the URL of a Web page, and may be a uniform resource identifier (URI). The "explanation" is the explanation of a sightseeing spot acquired from a Web page, that is, sightseeing information. For example, the first row in FIG. 2 indicates that a Web page introducing a "spot A" with the spot ID of "151" has a URL "http://○△□" and n explanation acquired from the'Web page is "Osamu Dazai . . . ramen . . . ".

Referring back to FIG. 1, the feature term storage portion 122 selects a feature term representing an actual entity (hereinafter referred to as an actual feature term) from among feature terms extracted from a Web page, associates the selected feature term with a spot ID, and stores them. FIG. 3 is a diagram illustrating an example of the feature term storage portion. As illustrated in FIG. 3, the feature term storage portion 122 has the items of "spot ID" and "feature term". The feature term storage portion 122 stores, for example, each pair of a spot ID and a feature term as a single record.

The "spot ID" is an identifier identifying a Web page for introducing a sightseeing spot. The "feature term" is information representing an actual feature term selected from among feature terms extracted from a Web page identified by a spot ID. In the example in FIG. 3, the Web page with the spot ID of "151" is associated with the feature terms of "Osamu Dazai" and "ramen". The Web page with the spot ID of "152" is associated with the feature terms of "Osamu Dazai" and "novel".

Referring back to FIG. 1, the itinerary information storage portion 123 associates itinerary information regarding a travel plan created by a user with a user ID and stores them. The itinerary information is information about an itinerary including the route from a departure point to an arrival point via a sightseeing spot. The itinerary information may also include, for example, a stay time at each sightseeing spot, a time of travel to each sightseeing spot, and positional information of each sightseeing spot.

The control unit 130 is realized by, for example, causing a central processing unit (CPU), a micro processing unit (MPU), or the like to execute a program stored in an internal storage device in a RAM serving as a working area. The control unit 130 may also be realized by, for example, an integrated circuit such as an application specific integrated circuit (ASIC) or a field programmable gate array (FPGA). The control unit 130 includes an acceptance portion 131, an extraction portion 132, a search portion 133, a classification portion 134, and a presentation portion 135, and realizes or executes functions and operations of information processing to be described below. The internal configuration of the control unit 130 is not limited to the configuration illustrated in FIG. 1, and may have another configuration on condition that information processing to be described below is performed with the configuration.

The acceptance portion 131, for example, accepts the specification of an analysis target Web page from the administrator of the information processing apparatus 100. The acceptance portion 131, for example, accesses the analysis target Web page based on the URL of the Web page and displays the Web page. For example, when a user presses a specification button (not illustrated), the acceptance portion 131 accepts the specification, of a currently displayed Web page as an analysis target Web page.

Upon accepting the specification of the analysis target Web page, the acceptance portion 131 analyzes the Web page and extracts sightseeing information corresponding to a predetermined item from the Web page. For example, the acceptance portion 131 extracts, from the analysis target Web page, the name of a sightseeing spot, that is, a spot name and the explanation of the sightseeing spot as sightseeing information. The acceptance portion 131 associates the extracted sightseeing information, that is, the spot name and the explanation, with the spot ID and URL of the Web page and stores them in the sightseeing information storage portion 121. After storing the sightseeing information in the sightseeing information storage portion 121, the acceptance portion 131 outputs an extraction instruction to the extraction portion 132.

Figure 4:
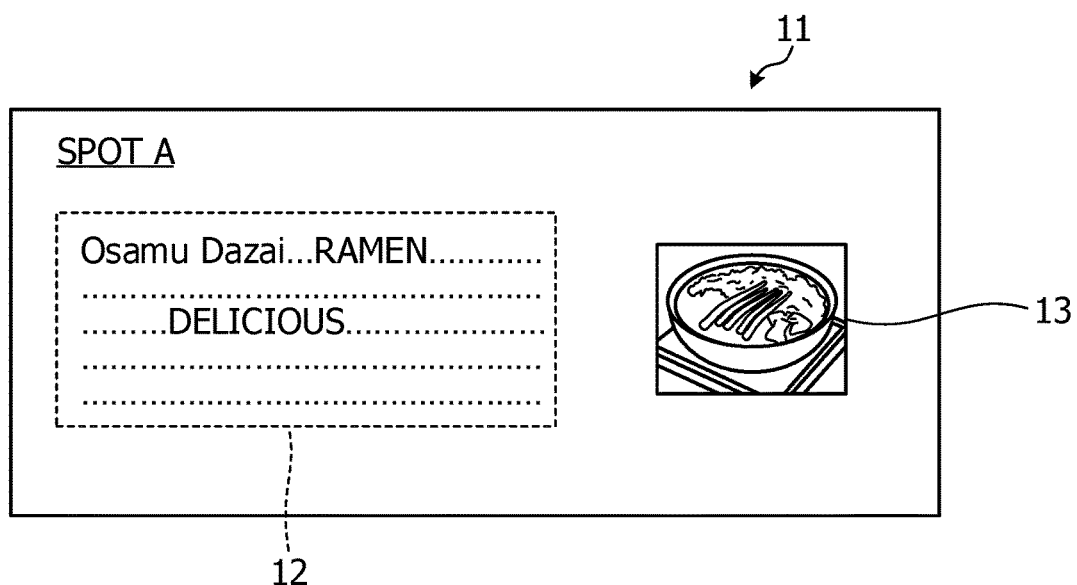
FIG. 4 is a diagram illustrating an example of an analysis target Web page.

An analysis target Web page will be described with reference to FIG. 4. FIG. 4 is a diagram illustrating an example of an analysis target Web page. As illustrated in FIG. 4, a Web page 11 is an example of a Web page for introducing a spot A that is a sightseeing spot. The Web page 11 includes an explanation 12 or introducing the spot A and an image 13 such as a photograph relevant to the spot A. The acceptance portion 131 associates the "spot A" that is a spot name and the explanation 12 with the spot ID and URL of the Web page 11 and stores them in the sightseeing information storage portion 121. The acceptance portion 131 may also store the image 13 in the sightseeing information storage portion 121.

Referring back to FIG. 1, upon receiving the extraction instruction from the acceptance portion 131, the extraction portion 132 refers to the sightseeing information storage portion 121 and extracts a feature term from an explanation. That is, the extraction portion 132 extracts the feature term from an analysis target Web page. For example, the extraction portion 132 performs morphological analysis upon the explanation to extract a noun as the feature term. After extracting one or more feature terms from the Web page, the extraction portion 132 outputs the one or more feature terms to the search portion 133 as a feature term group.

Upon receiving the feature term group from the extraction portion 132, the search portion 133 selects one of the feature terms in the feature term group. The search portion 133 refers to the feature term storage portion 122 and determines whether the selected feature term is stored in the feature term storage portion 122. In a case where the search portion 133 determines that the selected feature term is stored in the feature term storage portion 122, the search portion 133 determines whether there is a feature term that has yet to be subjected to searching. The search portion 133 also performs this determination upon receiving an instruction from the classification portion 134. In a case where the search portion 133 determines that there is a feature term that has yet to be subjected to searching, the search portion 133 selects the next feature term in the feature term group. Subsequently, the search portion 133 determines whether the selected feature term is stored in the feature term storage portion 122. In a case where the search portion 133 determines that there is no feature term that has yet to be subjected to searching, a feature term classification process ends.

In a case where the search portion 133 determines that the selected feature term is not stored in the feature term storage portion 122, the search portion 133 searches a predetermined term search site for the selected feature term. The predetermined term search site is an encyclopedia site such as Wikipedia (registered trademark) on which the explanation of an actual entity is given using an image. The search portion 133 searches the term search site to extract an image relevant to the feature term. That is, the search portion 133 does not extract an image common to Web pages for respective terms since the image is not relevant to the feature term. In a case where there is an image in a region on the term search site where the explanation of a term is given or a region used to place an image relevant to a term, the search portion 133 extracts the image as an image relevant to the feature term. For example, in, a case where there is an IMG tag in a region where the explanation of a Web page, for a term is given in hypertext markup language (HTML) or a region used to place an image relevant to a term, the search portion 133 extracts an image specified by the IMG tag. Examples of an image include not only a still image but also a moving image. In other words, the image extracted by the search portion 133 is an image associated with a page for the feature term on the predetermined term search site. The search portion 133 outputs the feature term and a result of image extraction to the classification portion 134.

The classification portion 134 determines whether an image has been extracted from the Web page of the term search site searched for the feature term based on the feature term and the result of image extraction input from the search portion 133. In a case where the classification portion 134 determines that an image has not been extracted, the classification portion 34 classifies the feature term as an unreal conceptual term. The classification portion 134 instructs the search portion 133 to determine whether there is a feature term that has yet to be subjected to searching.

In a case where the classification portion 134 determines that an image has been extracted, the classification portion 134 classifies the feature term as an actual term. The classification portion 134 associates the feature term with the Web page and stores them in the feature term storage portion 122. The classification portion 134 instructs the search portion 133 to determine whether there is a feature term that has yet to be subjected to searching. That is, the classification portion 134 classifies feature terms by storing an actual term in the feature term storage portion 122 and deleting an unreal term.

In other words, the classification portion 134 classifies feature terms based on a fact about whether an image has been detected as information corresponding to the feature term in searching performed by the search portion 133. In a case where an image has been detected as information corresponding to the feature term in searching performed by the search portion 133, the classification portion 134 classifies the feature term as a term representing an actual entity or place.

In the examples illustrated in FIGS. 2 and 4, Wikipedia (registered trademark) is searched for the feature terms "Osamu Dazai", "ramen", and "delicious" in the explanation of the spot A. The classification portion 134 determines that images corresponding to "Osamu Dazai" and "ramen" have been extracted since there are photographs in Web pages explaining "Osamu Dazai" and "ramen". The classification portion 134 associates the feature terms "Osamu Dazai" and "ramen", for which image extraction has been successfully performed, with the spot ID of the spot A and stores them in the feature term storage portion 122 as illustrated in FIG. 3. That is, the classification portion 134 classifies the feature terms "Osamu Dazai" and "ramen" as actual feature terms.

In contrast, a Web page explaining the term "delicious" itself may not be present and only a list of Web pages including the term "delicious" may be present. In this case, the classification portion 134 determines that an image corresponding to the term "delicious" is unable to be extracted. That is, the classification portion 134 classifies the term "delicious" as a conceptual term. For example, in a case where the classification portion 134 searches Wikipedia (registered trademark) for the feature term "explanation", there is a Web page explaining "explanation". However, since there is no image in the Web page, the classification portion 134 determines that an image corresponding to the term "explanation" is unable to be extracted. That is, the classification portion 134 classifies the term "explanation" as a conceptual term.

Referring back to FIG. 1, in a case where a user is browsing a Web page including the information presentation service using the terminal apparatus 10, the presentation portion 135 performs an information presentation process of presenting information regarding the Web page. It is assumed that a user is browsing a Web page provided by the Web server 200 using the terminal apparatus 10. It is further assumed that the Web page provided by the Web server 200 has been subjected to the above-described classification of feature terms, sightseeing information included in the Web page has been stored in the sightseeing information storage portion 121, and classified feature terms have been stored in the feature term storage portion 122. It is still further assumed that a button for the information presentation service is placed on the Web page.

The presentation portion 135 receives a presentation instruction from the terminal apparatus 10 that is displaying the Web page via the network N and the communication unit 110. The presentation instruction includes, for example, an identifier such as an Internet protocol (IP) address identifying the terminal apparatus 10, an identifier such as a user ID identifying a users the URL of the Web page. The presentation portion 135 specifies the Web page based on the URL of the Web page included in the presentation instruction.

The presentation portion 135 refers to the sightseeing it formation storage portion 121 and the feature term storage portion 122. The presentation portion 135 acquires a feature term associated with the specified Web page. The presentation portion 135 refers to the sightseeing information storage portion 121 and the feature term storage portion 122. The presentation portion 135 acquires sightseeing information corresponding to the acquired feature term, that is, specifies a spot ID corresponding to the acquired feature term. The presentation portion 135 acquires the spot name and explanation of a sightseeing spot corresponding to the specified spot ID.

The presentation portion 135 generates screen information to be presented for the user of the terminal apparatus 10 based on the acquired sightseeing information. The screen information for presentation is for example, presentation screen information to be popped up on the Web page. The presentation portion 135 transmits the generated screen information for presentation to the terminal apparatus 10 via the communication unit 110 and the network N to cause the terminal apparatus 10 to present the information.

After causing the terminal apparatus 10 to display a presentation screen based on the generated screen information for presentation, the presentation portion 135 determines whether an addition instruction has been received. In a case where the presentation portion 135 has not received an addition instruction, the presentation portion 135 determines whether a presentation end instruction has been received from the terminal apparatus 10 via the network N and the communication unit 110, that is, the presentation screen is closed. In a case where the presentation screen is not closed, the presentation portion 135 waits to receive an addition instruction. In a case where the presentation screen is not closed, the presentation portion 135 ends the information presentation process.

In a case where the presentation portion 135 has received n addition instruction, the presentation portion 135 refers to the itinerary information storage portion 123. The presentation portion 135 acquires itinerary information of the user based on, for example, a user ID. The presentation portion 135 creates a travel plan creation page in which a sightseeing spot corresponding to the addition instruction is added to a travel plan based on the acquired itinerary information. The presentation portion 135 transmits the created travel plan creation page to the terminal apparatus 10 via the communication unit 110 and the network N to cause the terminal apparatus 10 to display the page. The presentation portion 135 receives travel plan selection information from the terminal apparatus 10 via the network N and the communication unit 110. The presentation portion 135 updates itinerary information about a user's travel plan stored in the itinerary information storage portion 123 based on the received travel plan selection information and ends the information presentation process.

That is, in a case where an image has been detected as information corresponding to the feature term in searching performed by the search portion 133, the presentation portion 135 presents a place retrieved using the feature term as a sightseeing spot relevant to the Web page. The sightseeing spot is presented in a manner that the sightseeing spot can be added to a specific itinerary. The presentation portion 135 pops up the place retrieved using the feature term on the Web page.

Figure 5:
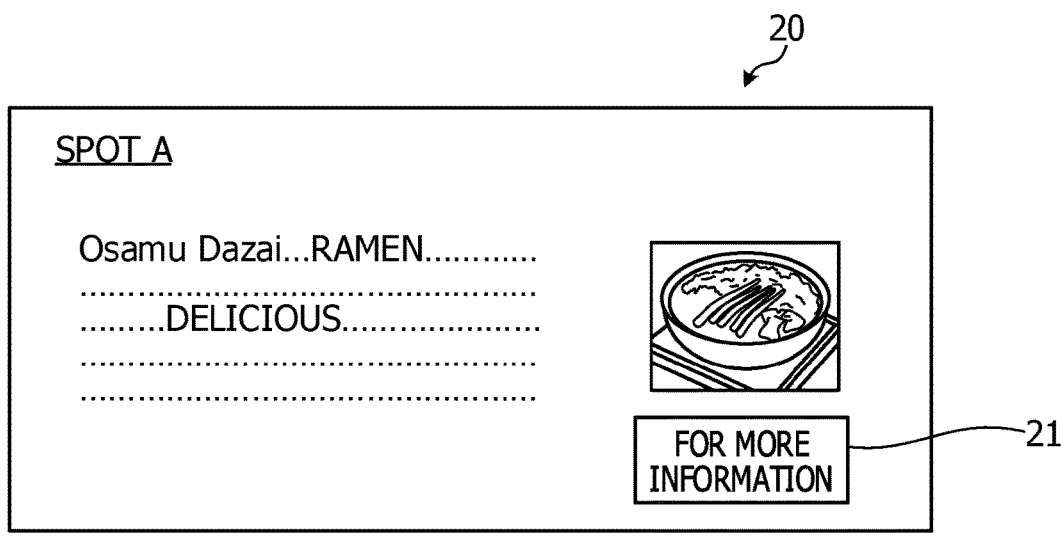
FIG. 5 is a diagram illustrating an example of a Web page including information presentation service.

A concrete example of an information presentation process will be described with reference to FIGS. 5 to 7. FIG. 5 is a diagram illustrating an example of a Web page including the information presentation service. As illustrated in FIG. 5, on a Web page 20 made to provide the information presentation service after the completion of analysis, a button 21 at which, for example, "for more information" is displayed is present. For example, a user who is browsing the Web page 20 for a spot A relevant to "Osamu Dazai" presses the button 21 to know sightseeing information about the spot A. When the button 21 is pressed, the terminal apparatus 10 transmits a presentation instruction to the information processing apparatus 100.

Upon receiving the presentation instruction, the presentation portion 135 in the information processing apparatus 100 refers to the sightseeing information storage portion 121. The presentation portion 135 acquires the spot ID "151" of the spot A based on the URL of the Web page. The presentation portion 135 refers to the feature term storage portion 122. The presentation portion 135 acquires feature terms "Osamu Dazai" and "ramen" corresponding to the spot ID "151". The presentation portion 135 searches the feature term storage portion 122 for the acquired feature terms "Osamu Dazai" and "ramen". The presentation portion 135 acquires spot IDs "152", "153", and "154" associated with the feature term "Osamu Dazai". In the example of the feature term storage portion 122 illustrated in FIG. 3, only the spot ID "151" is associated with the feature term "ramen". The presentation portion 135 refers to the sightseeing information storage portion 121. The presentation portion 135 acquires the spot names, explanations, and the like of the spots B, C, and D corresponding to the spot IDs "152", "153", and "154" and generates screen information for presentation. Images are not illustrated in the sightseeing information storage portion 121 in FIG. 2, but are associated with corresponding spot IDs and are stored in the sightseeing information storage portion 121 in reality. The presentation portion 135 transmits the generated screen information for presentation to the terminal apparatus 10 to cause the terminal apparatus 10 to present the information.

Figure 6:
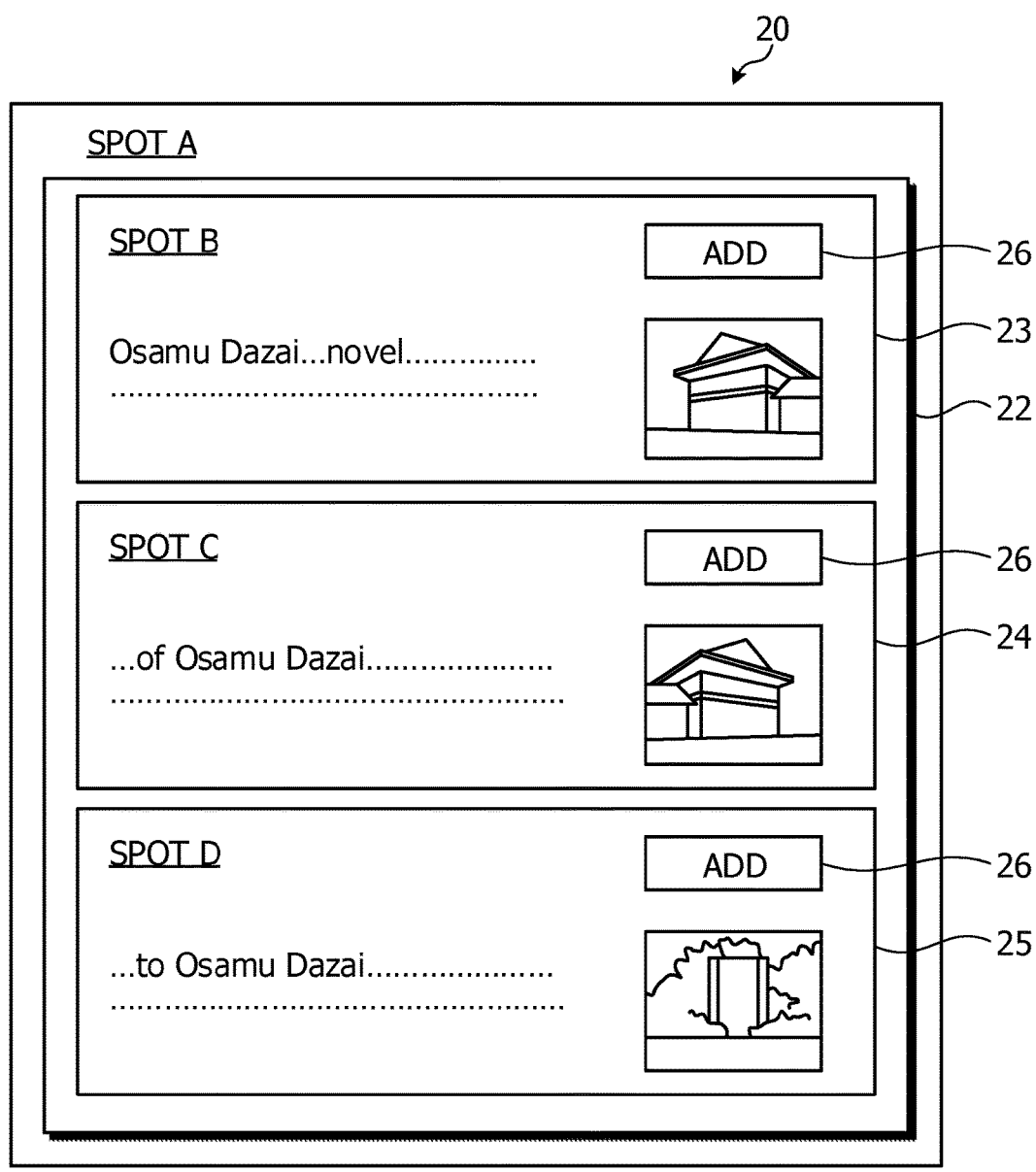
FIG. 6 is a diagram illustrating exemplary presentation of relevant sightseeing spots.

FIG. 6 is a diagram illustrating exemplary presentation of relevant sightseeing spots. As illustrated in FIG. 6, upon receiving the screen information for presentation from the information processing apparatus 100, the terminal apparatus 10 pops up a presentation screen 22 on the Web page 20. The presentation screen 22 includes, for example, information 23 about the spot B, information 24 about the spot C, and information 25 about the spot D. The spots B, C, and D are sightseeing spots including in their explanations the feature term "Osamu Dazai" common to the spot A. Each of the pieces of information 23, 24, and 25 includes an add button 26 used to add a corresponding spot to an itinerary.

The user of the terminal apparatus 10 browses the presentation. screen 22 and presses the add button 26 to add, for example, the spot D to an itinerary. The terminal apparatus 10 transmits an addition instruction for adding the spot D to the information processing apparatus 100. Upon receiving the addition instruction, the information processing apparatus 100 acquires itinerary information of the user from the itinerary information storage portion 123 and creates a travel plan creation page in which the spot D is added to a travel plan in accordance with the addition instruction. The information processing apparatus 100 transmits the created travel plan creation page to the terminal apparatus 10 to cause the terminal apparatus 10 to present the page.

Figure 7:
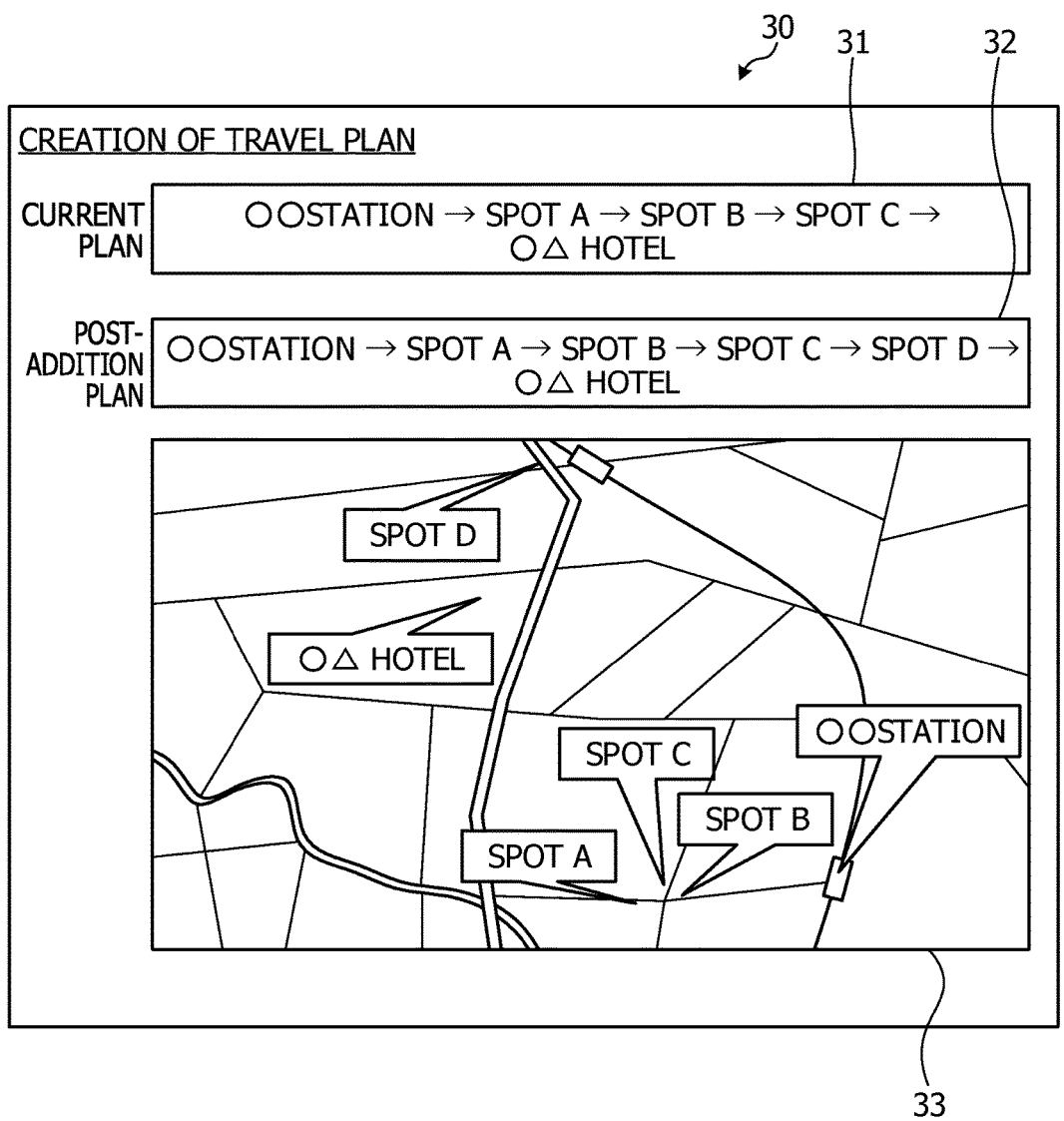
FIG. 7 is a diagram illustrating an exemplary display after a sightseeing spot has been added to an itinerary.

FIG. 7 is a diagram illustrating an exemplary display after a sightseeing spot has been added to an itinerary. As illustrated in FIG. 7, a travel plan creation page 30 includes, for example, a current plan 31, a post-addition plan 32 obtained by adding the spot D to the current plan 31, and a map 33 representing sightseeing spots included in respective plans. The map 33 may be provided using external map service. For example, in the map 33, sightseeing spots included in the current plan 31 may be displayed when a user presses the current plan 31 and sightseeing spots included in the post-addition plan 32 may be displayed when a user presses the post-addition plan 32. When a user selects, for example, the post-addition plan 32, the terminal apparatus 10 transmits information about the selectin of the post-addition plan 32 to the information processing apparatus 100. The information processing apparatus 100 updates itinerary information about the travel plan of the user stored in the itinerary information storage portion 123 based on the received information about the selection of the post-addition plan 32 and ends the information presentation process.

Figure 8:
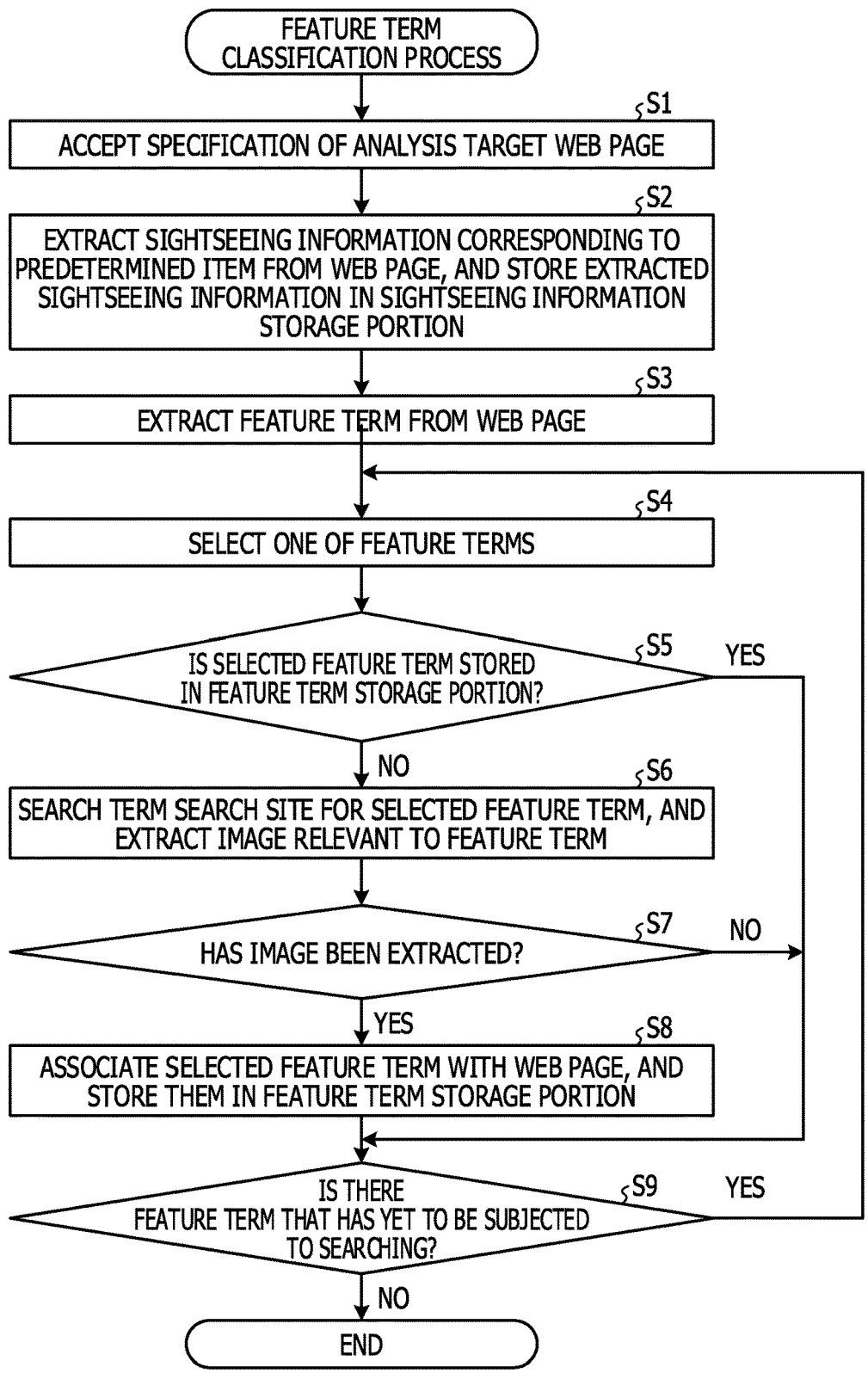
FIG. 8 is a flowchart illustrating an example of a feature term classification process according to an embodiment.

Next, the operation of the information processing system 1 will be described. First, a feature term classification process performed by the information processing apparatus 100 will be described. FIG. 8 is a flowchart illustrating an example of a feature term classification process according to an embodiment.

The acceptance portion 131 in the information, processing apparatus 100 accepts the specification of an analysis target Web page from the administrator of the information processing apparatus 100 (S1). Upon accepting the specification of the analysis target Web page, the acceptance portion 131 analyzes the Web page and extracts sightseeing information corresponding to a predetermined item from the Web page. The acceptance portion 131 associates the extracted sightseeing information with the spot ID and URL of the Web page and stores them in the sightseeing information storage portion 121 (S2). After storing the sightseeing information in the sightseeing information storage portion 121, the acceptance portion 131 outputs an extraction instruction to the extraction portion 132.

Upon receiving the extraction instruction from the acceptance portion 131, the extraction portion 132 extracts a feature term from the analysis target Web page (S3). That is, the extraction portion 132 refers to the sightseeing information storage portion 121 and extracts a feature term from an explanation. After extracting one or more feature terms from the Web page, the extraction portion 132 outputs the one or more feature terms to the search portion 133 as a feature term group.

Upon receiving the feature term group from the extraction portion 132, the search portion 133 selects one of the feature terms, in the feature term group (S4). The search portion 133 refers to the feature term storage portion 122. The search portion 133 determines whether the selected feature term is stored in the feature term storage portion 122 (S5). In a case where the search portion 133 determines that the selected feature term is stored in the feature term storage portion 122 (Yes in S5), the process proceeds to S9.

In a case where the search portion 133 determines that the selected feature term is not stored in the feature term storage portion 122 (No in S5), the search portion 133 searches the term search site for the selected feature term. The search portion 133 extracts an image relevant to the feature term (S6). The search portion 133 outputs the feature term and a result of image extraction to the classification portion 134.

The classification portion 134 determines whether an image has been extracted from the Web page of the term search site searched for the feature term based on the feature term and the result of image extraction input from the search portion 133 (S7). In a case where the classification portion 134 determines that an image has not been extracted (No in S7), the classification portion 134 classifies the feature term as an unreal conceptual term. The process proceeds to S9.

In a case where the classification portion 134 determines that an image has been extracted (Yes in S7), the classification portion 134 classifies the feature term as an actual term, associates the feature term with the Web page, and stores them in the feature term storage portion 122 (S8). The classification portion 134 instructs the search portion 133 to determine whether there is a feature term that has yet to be subjected to searching.

In a case where the search portion 133 determines that the selected feature term is stored in the feature term storage portion 122 or receives instruction for determining whether there is a feature term has yet to be subjected to searching from the classification portion 134, the search portion 133 determined whether there is a feature term that has yet to be subjected to searching (S9). In a case where the search portion 133 determines that there is a feature term that has yet to be subjected to searching (Yes in S9), the process returns to S4. In a case where the search portion 133 determines that there is no feature term that has yet to be subjected to searching (No in S9), the feature term classification process ends. Thus, the information processing apparatus 100 can classify feature terms.

Figure 9:
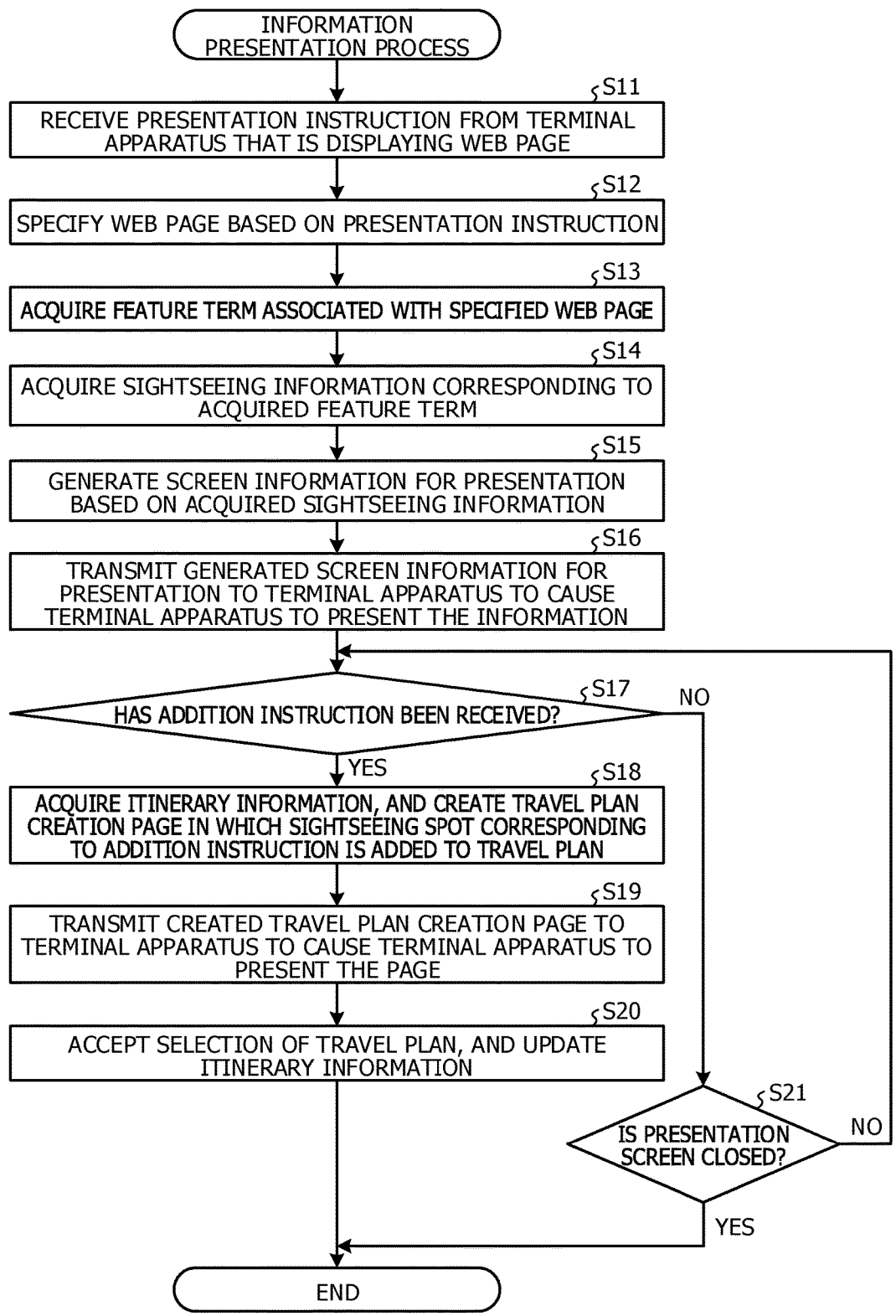
FIG. 9 is a flowchart illustrating an example of an information presentation process according to an embodiment.

Next, the information presentation process performed by the information processing system 1 will be described. FIG. 9 is a flowchart illustrating an example of the information presentation process according to an embodiment.

Upon accepting, the operation of a user, the terminal apparatus 10 displays a Web page provided by the Web server 200. It is assumed that the Web page has been subjected to analysis and the classification of feature terms in the information processing apparatus 100, sightseeing information included in the Web page has been stored in the sightseeing information storage portion 121, and classified feature terms have been stored in the feature term storage portion 122. When a user presses a button used to provide the information presentation service for presenting sightseeing information about a sightseeing spot on the Web page, the terminal apparatus 10 transmits a presentation instruction to the information processing apparatus 100.

The presentation portion 135 in the information processing apparatus 100 receives the presentation instruction from the terminal apparatus 10 that is displaying the Web page (S11). The presentation portion 135 specifies the Web page based on the URL of the Web page included in the presentation instruction (S12). The presentation portion 135 refers to the sightseeing information storage portion 121 and the feature term storage portion 121. The presentation portion 135 acquires a feature term associated with the specified Web page (S13). The presentation portion 135 refers to the sightseeing information storage portion 121 and the feature term storage portion 122. The presentation portion 135 acquires sightseeing information corresponding to the acquired feature term (S14).

The presentation portion 135 generates screen information to be presented for the user of the terminal apparatus 10 based on the acquired sightseeing information (S15). The presentation portion 135 transmits the generated screen information for presentation to the terminal apparatus 10 to cause the terminal apparatus 10 to present the information (S16).

The terminal apparatus 10 receives the screen information for presentation corresponding to the presentation instruction from the information processing apparatus 100. The terminal apparatus 10, for example, pops up a presentation screen on a currently displayed Web page based on the received screen information for presentation. When the user presses an add button on the presentation screen, the terminal apparatus 10 transmits an addition instruction for adding a sightseeing spot corresponding to the pressed add button to the information processing apparatus 100.

After causing the terminal apparatus 10 to display the presentation screen, the presentation portion 135 in the information processing apparatus 100 determines whether an addition instruction has been received. (S17). In a case where the presentation portion 135 determines that an addition instruction has been received (Yes in S17), the presentation portion 135 refers to the itinerary information storage portion 123 and acquires itinerary information of the user. The presentation portion 135 creates a travel plan creation page in which a sightseeing spot corresponding to the addition instruction is added to a travel plan based on the acquired itinerary information (S18). The presentation portion 135 transmits the created travel plan creation page to the terminal apparatus 10 to cause the terminal apparatus 10 to present the page (S19).

The terminal apparatus 10 receives and displays the travel plan creation page to accept the selection of a travel plan. The terminal apparatus 10 transmits accepted travel plan selection information to the information processing apparatus 100.

The presentation portion 135 in the information processing apparatus 100 receives the travel plan selection information from the terminal apparatus 10. The presentation portion 135 accepts the selection of a travel plan and updates itinerary information about a user's travel plan stored in the itinerary information storage portion 123 based on the received travel plan selection information (S20) and ends the information presentation process.

Returning to the description of S17, in a case where the presentation portion 135 determines that an addition instruction has not been received (No in S17), the presentation portion 135 determines whether the presentation screen is closed (S21). In a case where the presentation portion 135 determines that the presentation screen is not closed (No in S21), the process returns to S17. In a case where the presentation portion 135 determines that the presentation screen is closed (Yes in S21), the presentation portion 135 ends the information presentation process. Thus, the information processing apparatus 100 can present, for the user of the terminal apparatus 10, information about a sightseeing spot relevant to a sightseeing spot on a currently displayed Web page. The information processing apparatus 100 can add the relevant sightseeing spot, which has been selected based on the sightseeing spot information presented for the user, to the itinerary of the user.

As described above, the information processing apparatus 100 extracts a feature term from a Web page, makes a search using the extracted feature term, and classifies the feature term based on a fact about whether an image has been detected as information corresponding to the feature term in the searching. As a result, the information processing apparatus 100 can classify the feature term.

In a case where an image has been detected as information corresponding to the feature term in the searching, the information processing apparatus 100 classifies the feature term as a term representing an actual entity or place. As a result, the information processing apparatus 100 can classify an actual entity or place as a feature term.

In a case where an image has been detected as information corresponding to the feature term in the searching, the information processing apparatus 100 presents a place retrieved using the feature term as a sightseeing spot relevant to the Web page. As a result, the information processing apparatus 100 can present information about another sightseeing spot relevant to a sightseeing spot on a Web page a user is browsing The information processing apparatus 100 performs searching using a predetermined term search site. As a result, the information processing apparatus 100 can classify a feature term with which an image has been detected from the predetermined term search site.

The image detected by the information processing apparatus 100 is an image associated with a page of the predetermined term search site which corresponds to the feature term. As a result, the information processing apparatus 100 can classify feature terms each representing an actual entity or place.

In the information processing apparatus 100, a sightseeing spot is presented in a manner that the sightseeing spot can be added to a specific itinerary. As a result, the information processing apparatus 100 can add the presented sightseeing spot to a user's itinerary.

The information processing apparatus 100 pops up the place retrieved using the feature term on the Web page. As a result, the information processing apparatus 100 can present a sightseeing spot relevant to the Web page in an easy-to-understand manner.

In the above-described embodiment, sightseeing information includes a sightseeing spot name and an explanation. However, sightseeing information may include, for example, the position of a sightseeing spot, an average stay time, an image, a feature, an open date and time, and a fee. Sightseeing information may further include traffic information around a sightseeing spot, for example, a route name, a timetable, and a fare. Sightseeing information may still further include information about travel products, for example, a name, an itinerary, the day of departure, the minimum number of participants, and a fee.

In the above-described embodiment, as an analysis target Web page and a predetermined term search site, Japanese Web page and site are used. However, a Web page and a site written in another language such as English may be used.

Illustrated components of the respective units are not necessarily have to be physically configured as illustrated in the drawings. That is, specific forms of separation and integration of the respective units are not limited to the examples illustrated in the drawings. All or a part thereof can be functionally or physically separated or integrated in any unit according to various types of loads and usage. For example, the acceptance portion 131, the extraction portion 132, and the search portion 133 may be integrated. Illustrated pieces of processing do not necessarily have to be performed in the above-described order, and may be performed simultaneously or in a different order without causing inconsistency in the contents of the pieces of processing.

In addition, various types of processing functions performed in the respective devices may be configured such that all or any part thereof are executed on the CPU (or a microcomputer such as an MPU or a micro controller unit (MCU)). Needless to say, the various types of processing functions may be configured such that all or any part thereof are executed on a program which is analyzed and executed in the CPU (or the microcomputer such as an MPU or an MCU), or on a piece of hardware by wired logic.

Figure 10:
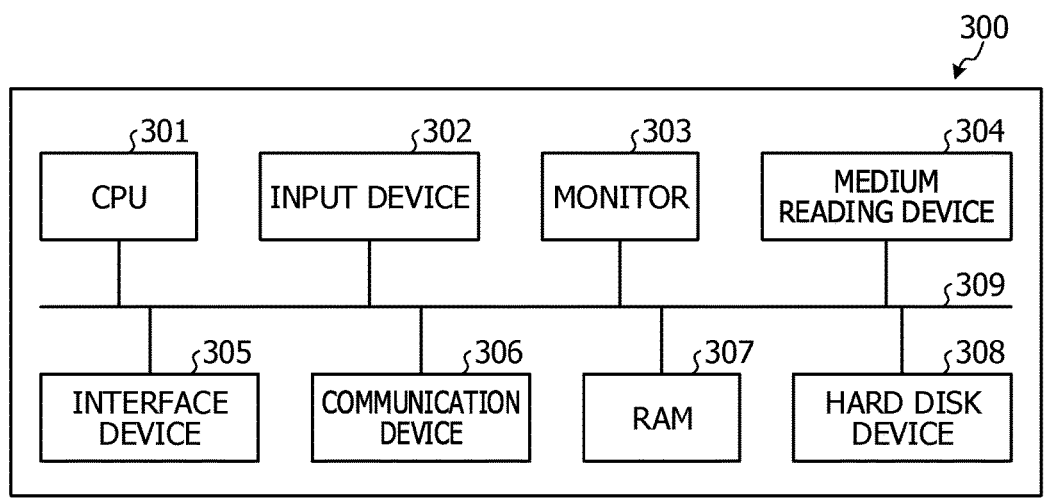
FIG. 10 is a diagram illustrating an example of a computer for executing a feature term classification program.

Various types of pieces of processing described in the above-described embodiment can be realized by a computer executing a computer program prepared in advance. An example of a computer that executes a program having a function similar to that of the above-described embodiment will be described. FIG. 10 is a diagram illustrating an example of a computer for executing a feature term classification program.

As illustrated in FIG. 10, a computer 300 includes a CPU 301 for performing various types of pieces of computation processing, an input device 302 for accepting data input, and a monitor 303. The computer 300 further includes a medium reading device 304 for reading a program or the like from a storage medium, an interface device 305 used to be connected to various devices, and a communication device 306 used to be connected to another information processing apparatus or the like in a wired or wireless manner. The computer 300 still further includes a Random Access Memory (RAM) 307 for temporarily storing various pieces of information and a hard disk device 308. The devices 301 to 308 are connected to a bus 309.

A feature term classification program having functions similar to those of the acceptance portion 131, the extraction portion 132, the search portion 133, the classification portion 134, and the presentation portion 135 illustrated in FIG. 1 is stored in the hard disk device 308. Various pieces of data for realizing the sightseeing information storage portion 121, the feature term storage portion 122, the itinerary information storage portion 123, and the feature term classification program are stored in the hard disk device 308. The input device 302 accepts, from the administrator of the computer 300, for example, various pieces of information such as operational information. The monitor 303 displays, for the administrator of the computer 300, for example, various screens such as a display screen. The interface device 305 is connected to, for example, a printing device. The communication device 306 has, for example, a function similar to that of the communication unit 110 illustrated in FIG. 1. The communication device 306 is connected to the network N to exchange various types of pieces of information with the terminal apparatus 10 and the Web server 200.

The CPU 301 reads each program stored in the hard disk device 308. The CPU 301 then develops and executes the program in the RAM 307, thereby performing the various types of pieces of processing. These programs can cause the computer 300 to function as the acceptance portion 131, the extraction portion 132, the search portion 133, the classification portion 134, and the presentation portion 135 illustrated in FIG. 1.

The above-described feature term classification program does not necessarily have to be stored in the hard disk device 308. For example, a program stored in a storage medium readable by the computer 300 may be read and executed by the computer 300. The storage medium readable by the computer 300 corresponds to, for example, a portable recording medium, a semiconductor memory, or a hard disk drive. Examples of the portable recording medium include a CD-ROM, a DVD, and a universal serial bus (USB) memory. Examples of the semiconductor memory include a flash memory. Alternatively, the feature term classification program may be stored in a device connected to, for example, a public line, the Internet, or a LAN. The computer 300 may read the feature term classification program from the device and execute the program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made, hereto without departing from the spirit and scope of the invention.

What is claimed is:

1. A feature term classification method executed by a processor included in an information processing apparatus including a display device and a memory, the feature term classification method comprising;
   extracting a feature term from a Web page displayed on a screen of the display device;
   executing image searching using the extracted feature term;
   classifying the feature term based on whether an image has been detected as information corresponding to the feature term in the image searching;
   storing the information corresponding to the feature term in the memory,
   when a new feature term has been input, extracting a Web page corresponding to the new feature term from the stored information corresponding to the feature terms; and
   displaying the extracted Web page.

2. The feature term classification method according to claim 1, wherein the storing includes
   storing the feature term in the memory as a term representing an actual entity or place when an image has been detected as information corresponding to the feature term in the image searching.

3. The feature term classification method according to claim 2, wherein the classifying includes
   deleting the feature term when an image has not been detected as information corresponding to the feature term in the image searching.

4. The feature term classification method according to claim 1,
   wherein the stored information is information in which an identifier that identifies a Web page and a feature term are associated with each other for each of a plurality of Web pages.

5. The feature term classification method according to claim 1, wherein the classifying includes
   displaying a place retrieved using the feature term as a sightseeing spot relevant to the Web page when an image has been detected as information corresponding to the feature term ire the image searching.

6. The feature term classification method according to claim 5,
   wherein the sightseeing spot is displayed in a manner that the sightseeing spot can be added to a specific itinerary.

7. The feature term classification method according to claim 5,
   wherein the place retrieved using the feature term is popped up on the Web page.

8. The feature term classification method according to claim 1,
   wherein the image searching is executed using a predetermined term search site.

9. The feature term classification method according to claim 8, further comprising
   determining whether the image has been extracted from a Web page of the predetermined term search site on which the image searching was executed using the extracted feature term.

10. The feature term classification method according to claim 8,
    wherein the image is associated with a page of the predetermined term search site which corresponds to the feature term.

11. An information processing apparatus comprising:
    a display device;
    a memory; and
    a processor that is coupled to the display device and the memory, and is configured to,
        extract a feature terror from a Web page displayed on a screen of the display device,
        execute image searching using the extracted feature term,
        classify the feature term based on whether an image has been detected as information corresponding to the feature term in the image searching,
        storing the information corresponding to the feature term in the memory;
    when a new feature term has been input, extract a Web page corresponding to the new feature term from the stored information corresponding to the feature terms, and
    display the extracted Web page.

12. The information processing ,apparatus according to claim 11, wherein the processor is configured to
    store the feature term in the memory as a term representing an actual entity or place when an image has been detected as information corresponding to the feature term in the image searching.

13. The information processing apparatus according to claim 12, wherein the processor is configured to
    delete the feature term when an image has not been detected as information corresponding to the feature term in the image searching.

14. The information processing apparatus according to claim 11, wherein the stored information is information in which an identifier that identifies a Web page and a feature term are associated with each other for each of a plurality of Web pages.

15. A non-transitory computer-readable storage medium storing a program that causes a processor included in an information processing apparatus. including a display device and a memory to execute a process, the process comprising:

extracting a feature term om a Web page displayed on a screen of the display device;

executing image searching using the extracted feature term;

classifying the feature term based on whether an image has been detected as information corresponding to the feature term in the image searching;

storing the inform corresponding to the feature in the memory;

when a new feature term has been input, extracting a Web page corresponding to the new feature term from the stored information corresponding to the feature terms; and displaying the extracted Web page.

* * * * *